United States Patent
Gunter et al.

(10) Patent No.: US 12,174,780 B2
(45) Date of Patent: Dec. 24, 2024

(54) SYNCHRONIZATION IN MULTI-CHIP SYSTEMS

(71) Applicant: Google LLC, Mountain View, CA (US)

(72) Inventors: Michial Allen Gunter, San Francisco, CA (US); Denis Baylor, Cupertino, CA (US); Clifford Biffle, Berkeley, CA (US); Charles Ross, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/128,401

(22) Filed: Mar. 30, 2023

(65) Prior Publication Data
US 2023/0237007 A1   Jul. 27, 2023

Related U.S. Application Data

(63) Continuation of application No. 17/844,888, filed on Jun. 21, 2022, which is a continuation of application
(Continued)

(51) Int. Cl.
*G06F 15/173*   (2006.01)
*G06F 15/17*    (2006.01)
(Continued)

(52) U.S. Cl.
CPC ........ *G06F 15/17312* (2013.01); *G06F 15/17* (2013.01); *G06F 15/17337* (2013.01);
(Continued)

(58) Field of Classification Search
CPC ................. G06F 13/4247; G06F 15/17; G06F 15/17312; G06F 15/17337; G06N 3/063;
(Continued)

(56) References Cited

U.S. PATENT DOCUMENTS

| | | |
|---|---|---|
| 5,838,254 A | 11/1998 | Brewer |
| 7,823,001 B2 | 10/2010 | Clavequin et al. |

(Continued)

FOREIGN PATENT DOCUMENTS

| | | |
|---|---|---|
| CN | 1494688 | 5/2004 |
| CN | 101226765 | 7/2008 |

(Continued)

OTHER PUBLICATIONS

Extended European Search Report in European Appln. No. 21197728.5, dated Jan. 21, 2022, 9 pages.
(Continued)

*Primary Examiner* — Terrell S Johnson
(74) *Attorney, Agent, or Firm* — Fish & Richardson P.C.

(57) ABSTRACT

Methods, systems, and apparatus, including computer programs encoded on a computer storage medium, for determining, for each pair of adjacent chips in a plurality of chips connected in a series-ring arrangement of a semiconductor device, a corresponding loop latency for round trip data transmissions between the pair of chips. Identifying, from among the loop latencies, a maximum loop latency. Determining a ring latency for a data transmission originating from a chip of the plurality chips to be transmitted around the series-ring arrangement and back to the chip. Comparing half of the maximum loop latency to one N-th of the ring latency, where N is the number of chips in the plurality of chips, and storing the greater value as an inter-chip latency of the semiconductor device, the inter-chip latency representing an operational characteristic of the semiconductor device.

20 Claims, 7 Drawing Sheets

Related U.S. Application Data

No. 17/346,058, filed on Jun. 11, 2021, now Pat. No. 11,372,801, which is a continuation of application No. PCT/US2020/046405, filed on Aug. 14, 2020.

(60) Provisional application No. 62/887,783, filed on Aug. 16, 2019.

(51) Int. Cl.
  *G06N 3/063* (2023.01)
  *H04L 12/44* (2006.01)
  *H04L 43/0864* (2022.01)

(52) U.S. Cl.
  CPC .............. *H04L 12/44* (2013.01); *G06N 3/063* (2013.01); *H04L 43/0864* (2013.01)

(58) Field of Classification Search
  CPC . H04L 12/44; H04L 43/0858; H04L 43/0864; H04L 43/086
  See application file for complete search history.

(56) References Cited

U.S. PATENT DOCUMENTS

| | | |
|---|---|---|
| 7,863,960 B2 | 1/2011 | Wang et al. |
| 9,191,193 B1 | 11/2015 | Huang et al. |
| 9,515,908 B2 | 12/2016 | Hayes |
| 9,541,949 B2 | 1/2017 | Kuzi et al. |
| 2003/0048754 A1 | 3/2003 | Bruckman |
| 2009/0222683 A1 | 9/2009 | Serebrin et al. |
| 2010/0302967 A1* | 12/2010 | Lee .................... H04L 43/0852 370/252 |
| 2014/0003564 A1* | 1/2014 | Kammaje ................ G06F 5/06 375/354 |
| 2015/0137862 A1 | 5/2015 | Bahl et al. |
| 2019/0097745 A1* | 3/2019 | Mallela ................ H04J 3/0667 |

FOREIGN PATENT DOCUMENTS

| | | |
|---|---|---|
| JP | H05-167589 | 7/1993 |
| JP | 2000-049836 | 2/2000 |
| JP | 2001-053792 | 2/2001 |
| JP | 2011-199420 | 10/2011 |
| JP | 2013-098788 | 5/2013 |

OTHER PUBLICATIONS

International Invitation to Pay Additional Fees in International Appln. No. PCT/US2020/046405, mailed on Nov. 16, 2020, 10 pages.
International Search Report and Written Opinion in International Appln. No. PCT/US2020/046405, mailed on Jan. 26, 2021, 19 pages.
Notice of Allowance in European Appln. No. 20764834.6, dated Mar. 16, 2023, 9 pages.
Office Action in Japanese Appln. No. 2021-577623, dated Mar. 13, 2023, 6 pages (with English translation).
Office Action in Taiwan Appln. No. 109127734, dated Aug. 10, 2021, 16 pages (with English translation).
Office Action in Taiwan Appln. No. 109127734, dated Dec. 1, 2021, 10 pages (with English translation).
Office Action in Taiwan Appln. No. 109127734, dated Oct. 11, 2022, 6 pages (with English translation).
Office Action in Chinese Appln. No. 202080047570.X, mailed on Jan. 27, 2024, 12 pages (with English translation).
Notice of Allowance in Japanese Appln. No. 2021-577623, mailed on Sep. 11, 2023, 5 pages (with English translation).

* cited by examiner

SYNCHRONIZATION IN MULTI-CHIP SYSTEMS

CROSS-REFERENCE TO RELATED APPLICATIONS

This application is a continuation of U.S. application Ser. No. 17/844,888, filed Jun. 21, 2022, which is a continuation of U.S. application Ser. No. 17/346,058, filed Jun. 11, 2021, which is a continuation of PCT Application No. PCT/US2020/046405, filed Aug. 14, 2020, which claims benefit of U.S. Provisional Application No. 62/887,783, filed Aug. 16, 2019, each of which are incorporated by reference herein in their entirety.

TECHNICAL FIELD

The present disclosure relates to timing synchronization and data transfer in multi-chip systems.

BACKGROUND

Electronic devices can composed of multiple different chips which need to communicate data amongst themselves in order for the electronic device to operate. Data communications between chips may be nondeterministic. For example, data communications between chips are subject to variable latencies between the transmission time at one chip to the reception time at another chip. That is the time it takes for data to travel from one chip to another is not constant, but subject to many different sources of variance in transmission time.

SUMMARY

In general, innovative aspects of the subject matter described in this specification can be embodied in an inter-chip latency characterization method that includes the actions of determining, for each pair of chips among a plurality of chips of a semiconductor device, a corresponding loop latency for round trip data transmissions between the pair of chips around a transmission path through the plurality of chips;
  identifying, from among the loop latencies, a maximum loop latency;
  determining a full-path latency for a data transmission originating from a chip of the plurality chips to be transmitted around the path and back to the chip;
  comparing half of the maximum loop latency to one N-th of the full-path latency, where N is the number of chips in the transmission path of chips, and storing the greater value as an inter-chip latency of the semiconductor device, the inter-chip latency representing an operational characteristic of the semiconductor device.

In a second general aspect, innovative features of the subject matter described in this specification can be embodied in an inter-chip latency characterization method that includes the actions of determining, for each pair of adjacent chips in a plurality of chips connected in a series-ring arrangement of a semiconductor device, a corresponding loop latency for round trip data transmissions between the pair of chips. The actions include identifying, from among the loop latencies, a maximum loop latency. The actions include determining a ring latency for a data transmission originating from a chip of the plurality chips to be transmitted around the series-ring arrangement and back to the chip. The actions include comparing half of the maximum loop latency to one N-th of the ring latency, where N is the number of chips in the plurality of chips, and storing the greater value as an inter-chip latency of the semiconductor device, the inter-chip latency representing an operational characteristic of the semiconductor device. Other implementations of this aspect include corresponding systems, apparatus, and computer programs, configured to perform the actions of the methods, encoded on computer storage devices.

These and other implementations can each optionally include one or more of the following features.

In some implementations, determining a loop latency for round trip data transmissions between the pair of chips includes the actions of: transmitting first timestamped data from a first chip of the pair of chips to a second chip of the pair of chips; determining, based on the first time stamped data, a first relative one-way latency between the pair of chips; transmitting second timestamped data from the second chip to the first chip; determining, based on the second time stamped data, a second relative one-way latency between the pair of chips, and determining the loop latency for the round trip data transmissions between the pair of chips based on the first relative one-way latency and the second relative one-way latency. In some implementations, the first timestamped data indicates a local counter time of the first chip when the first timestamped data was sent. In some implementations, determining the first relative one-way latency between the pair of chips includes computing a difference between a time indicated in the time stamped data and a local counter time of the second chip when the second chip received the first timestamped data. In some implementations, determining the loop latency for the round trip data transmissions between the pair of chips includes computing a difference between the first relative one-way latency and the second relative one-way latency.

In some implementations, one or more chips of the plurality of chips are application specific integrated circuit (ASIC) chips configured to execute neural network operations.

In a third general aspect, innovative features of the subject matter described in this specification can be embodied in an inter-chip timing synchronization method that includes the actions of, for each pair of chips in a plurality of chips of a semiconductor device: determining a first one-way latency for transmissions from a first chip in the pair to a second chip in the pair of chips, and determining a second one-way latency for transmissions from the second chip in the pair to the first chip in the pair of chips. The actions include receiving, at a semiconductor device driver, the first one-way latency and the second one-way latency for each pair of chips. The actions include determining, by the semiconductor device driver and from the respective first one-way latency and the second one-way latency for each pair of chips, a loop latency between each pair of chips. The actions include adjusting, by the semiconductor device driver and for at least one pair of chips, a local counter of the second chip in the at least one pair of chips based on a characteristic inter-chip latency of the semiconductor device and the first one-way latency of the at least one pair of chips. Other implementations of this aspect include corresponding systems, apparatus, and computer programs, configured to perform the actions of the methods, encoded on computer storage devices.

These and other implementations can each optionally include one or more of the following features.

In some implementations, the actions include determining, by the semiconductor device driver, that each loop latency is less than or equal to a characteristic inter-chip latency of the semiconductor device.

In some implementations, adjusting the local counter of the second chip in the at least one pair of chips includes increasing a value of the local counter by an adjustment value. In some implementations, the adjustment value is equal to the characteristic inter-chip latency of the semiconductor device plus the first one-way latency for transmissions from the first chip in the pair to a second chip in the pair.

In some implementations, determining the loop latency between each pair of chips includes computing, for each pair of chips, a difference between the first relative one-way latency associated with the pair of chips and the second relative one-way latency associated with the pair of chips.

In some implementations, determining the first one-way latency for transmissions from a first chip in the pair to a second chip in the pair of chips includes transmitting first timestamped data from the first chip to the second chip, and determining the first relative one-way latency between the pair of chips based on the first time stamped data. In some implementations, the first timestamped data indicates a local counter time of the first chip when the first timestamped data was sent. In some implementations, determining the first relative one-way latency between the pair of chips includes computing a difference between a time indicated in the time stamped data and a local counter time of the second chip when the second chip received the first timestamped data.

In some implementations, one or more chips of the plurality of chips are application specific integrated circuit (ASIC) chips configured to execute neural network operations.

In a fourth general aspect, innovative aspects of the subject matter described in this specification can be embodied in a method for transmitting data among chips that includes the actions of transmitting data, at a first time, from a first chip to a second, adjacent chip in a series-ring arrangement of chips of a semiconductor device. The actions include storing the data in a buffer at the second chip. The actions include releasing the data from the buffer at a second time, in which an interval between the first time and the second time is based on a characteristic inter-chip latency of the series-ring arrangement of chips. The actions include transmitting the data from the second chip to a third chip, the third chip being adjacent to the second chip in the series-ring arrangement of chips. Other implementations of this aspect include corresponding systems, apparatus, and computer programs, configured to perform the actions of the methods, encoded on computer storage devices.

These and other implementations can each optionally include one or more of the following features.

In some implementations, the a characteristic inter-chip latency represents the maximum expected one-way data transmission latency between two chips in the series-ring arrangement of chips.

In some implementations, the second time is a pre-scheduled time of an operating schedule for the second chip.

In some implementations, the actions include passing the data from the buffer of the second chip along an internal bypass path to a communication interface of the second chip that is coupled to the third chip.

In some implementations, one or more of the first, second, and third chips are application specific integrated circuit (ASIC) chips configured to execute neural network operations.

The various implementations provide one or more of the following advantages. For example, in some implementations, the processes described herein minimize the variance in potential data arrival times for inter-chip communications. Reducing the variance of data communications may permit the use of smaller receive data buffers in the chips of the system. In some implementations, the processes described herein make data transmission operations between chips deterministic. For example, implementations may make it possible for a program compiler to use a constant (e.g., deterministic) latency time when calculating a local counter time for a receiving chip to access data from an input buffer that was sent from a neighboring chip to the receiving chip at a particular time.

The details of one or more embodiments of the invention are set forth in the accompanying drawings and the description below. Other features and advantages will be apparent from the description, the drawings, and the claims.

DETAILED DESCRIPTION

Figure 1:
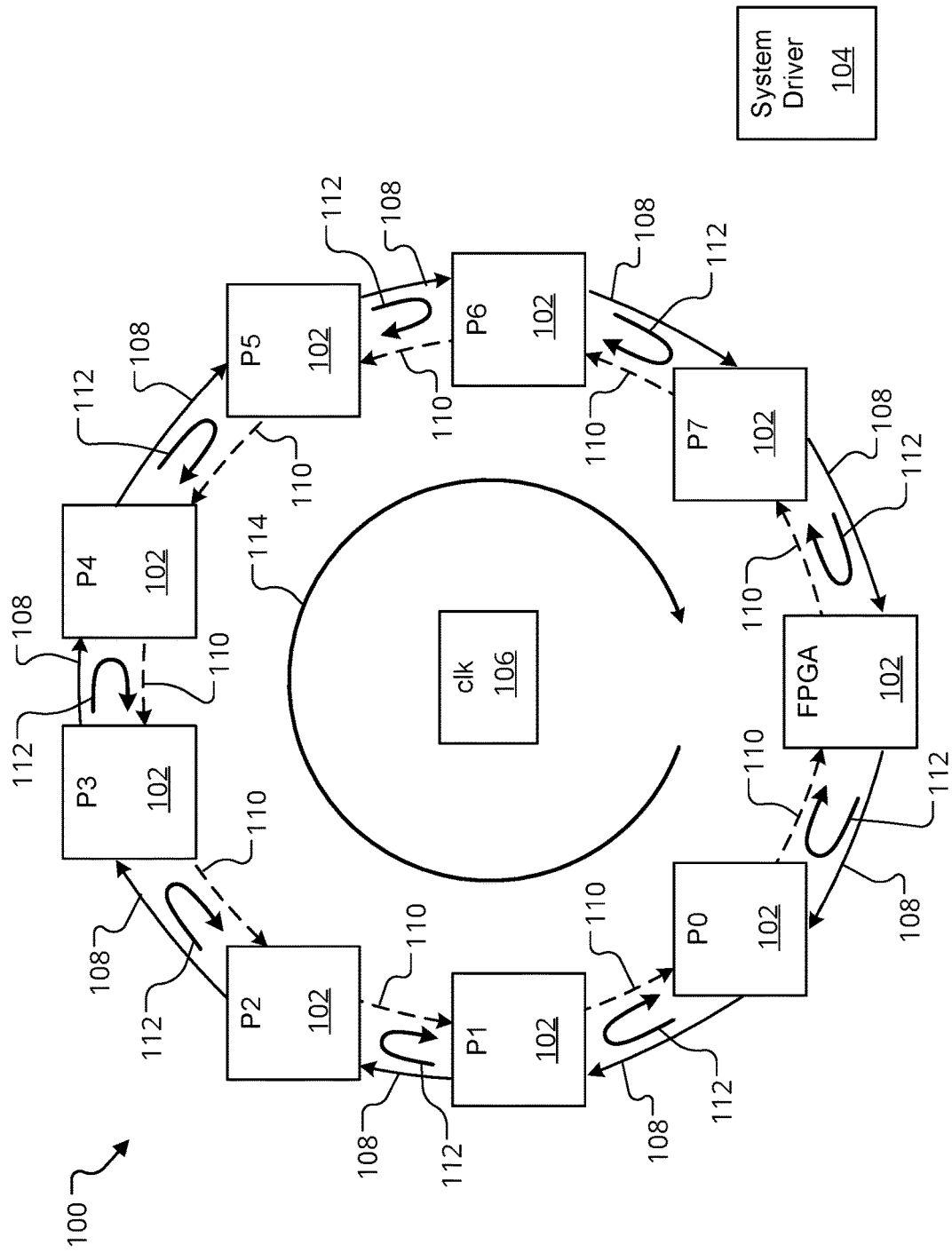
FIG. 1 is a schematic that illustrates an example multi-chip system in accordance with implementations of the present disclosure.

In general, the disclosure relates to inter-chip time synchronization and data transmission in multi-chip systems. More specifically, the disclosure provides chip operation processes that improve the predictability of data transmission between chips, and, in some examples, around a serial-ring topology of chips. The disclosure provides example processes for synchronizing the local counters of the chips in the system and performing data transmission in a way that accounts for the inherent variability data arrival times for inter-chip data transmissions making data reception times more, and in some cases, completely deterministic.

Referring first to inter-chip time synchronization, the time synchronization includes two aspects. A first aspect is characterization of inter-chip latency for data transmissions between respective pairs of chips on a processing system. This process provides an operational characteristic of the board (e.g., a maximum inter-chip latency) which serves as a constant for synchronizing local chip counters each time the board is booted. The second aspect is synchronizing the local chip counters when the board is booted (e.g., "boot-time synchronization").

More specifically, the characterization process must be completed for each re-design of a board. For example, the maximum inter-chip latency is generally a physical characteristic that is dependent on the layout of the chips on the board. The characterization process includes measuring the "round trip" loop latency for transmissions between pairs of chips (e.g., adjacent pairs of chips) on the board that will engage in direct communications with each other. Further, in implementations that include chips connected in a series-ring arrangement, the characterization process can also include measuring a round trip transmission latency around the whole ring. Data gathered from these measurements can be used to determine the maximum inter-chip latency that would be experienced between any two chips.

The boot-time synchronization is performed to synchronize the local counters of the chips each time the board is booted, reset, or both. While each chip is clocked by a local clock that is synchronized with the local clocks of the other chips (e.g., each chip's clock has the same frequency and phase), the chips operate using local counters to clock individual chip operations and, upon booting the board or the chips coming out of reset, the individual counters will generally be at different count values. Accordingly, the boot-time synchronization is used to approximately synchronize the local count values of the chips.

The boot-time synchronization process includes measuring one-way latencies for transmissions between pairs of chips on the board. A board driver determines a local counter adjustment for one chip in each pair based on the maximum inter-chip latency that has been characterized for the board and the one of the one-way latencies between the chips in the pair. For example, the driver can adjust the local counter of one of the chips in the pair by increasing the counter value by the sum of the maximum inter-chip latency and one of the one-way latencies between the chips. In some implementations, the boot-time process includes adjusting the round trip latencies between one or more chip pairs, e.g., by adjusting a FIFO buffer of one of the chips.

In some implementations, the semiconductor chips can be application-specific integrated circuits (ASIC) designed to perform machine learning operations. An ASIC is an integrated circuit (IC) that is customized for a particular use. For example, an ASIC may be designed to perform operations of machine learning models including, e.g., recognizing objects in images as part of deep neural networks, machine translation, speech recognition, or other machine learning algorithms. When used as an accelerator for a neural network, for instance, an ASIC can receive inputs to the neural network and compute a neural network inference for the inputs. Data inputs to a neural network layer, e.g., either the input to the neural network or the outputs of another layer of the neural network, can be referred to as activation inputs. The inferences can be computed in accordance with respective sets of weight inputs associated with the layers of the neural network. For example, some or all of the layers may receive a set of activation inputs and process the activation inputs in accordance with the set of weight inputs for the layer to generate outputs. Moreover, neural network operations can be performed by a system of ASICS according to explicit operations schedules. As such, deterministic and synchronized data transfers between the ASIC chips can improve the reliability of the neural network operation and simplify debugging operations.

FIG. 1 is a schematic that illustrates an example multi-chip system 100. The multi-chip system 100 can be a network of integrated circuits configured to perform machine learning operations. For example, the multi-chip system 100 can be configured to implement a neural network architecture. The multi-chip system includes a plurality of semiconductor chips 102. The chips 102 can be general purpose integrated circuit chips or special purpose integrated circuit chips. For example, one or more of the chips 102 can be ASICs, a field programmable gate array (FPGA), a graphics processing unit (GPU), or any other suitable integrated circuit chip. A clock 106 is coupled to each of the chips 102 to provide a synchronous timing signal. For example, clock 106 can include a crystal oscillator that provides a common timing signal (e.g., a 1 GHz clock signal) to each of the chips 102.

The system 100 also includes a system driver 104. The system driver 104 can be, for example, an external computing system such as a laptop computer, desktop computer, or server system. The system driver 104 can be used to perform or manage the chip synchronization processes described herein, or portions thereof. For example, the system driver 104 can be configured to program the chips, manage boot operations of the system 100, debug the chips, or a combination thereof. The system driver can be coupled to the chips 102 via a communication link. The system driver 104 can be coupled to the chips 102 through a configuration status register (e.g., a low speed interface for programing and debugging the chips).

In the illustrated example, the multi-chip system 100 includes eight ASIC chips 102 and one FPGA chip 102 arranged in a series-ring topology. More specifically, each chip 102 is in data communication with two adjacent chips; one on each side, such that data is communicated from chip to a neighboring chip around the ring. The chips 102 and their data communication links form a closed-loop. Furthermore, the multi-chip system 100 includes two data paths between each pair of chips; a clockwise path 108 and a counterclockwise path 110.

In some implementations, each ASIC chip (P0-P7) can be configured to implement a layer of a neural network. Input activation data may be received by the FPGA chip 104 and transmitted to P0. P0 can be configured to implement the input layer of the neural network, for example. P0 would perform computations on the activation data to generate layer output data, which would be transmitted to P1. P1 can be configured to implement the first hidden layer of the neural network and would perform computations on the output from P0, then transmit its output to the next neural network layer implemented by P2. The process may continue around the ring through each of the ASICs 102, and by extension processed by each layer of the neural network. Such a process may rely on precise timing of data transfers between adjacent chips (and around the entire ring) in order for the neural network to operate reliably and accurately. Consequently, synchronization of data transfers between each ASIC may, therefore, be important to ensure proper operational coordination between the chips.

Operations internal to a single chip in a synchronous system are synchronous and deterministic, meaning that there is no variance in the timing of such internal operations. However, for inter-chip operations, such as data transmission, there is an inherent and non-deterministic variability in the timing of the operations, even in a synchronous system. One source of timing variability is a property of the physical link between two adjacent chips, which can introduce a variance of, e.g., about 0-3 clock cycles in the latency of data transmission between adjacent chips. A second, larger source of timing variability is the lack of synchronization between internal chip operations and a forward error correction scheme implemented by the multi-chip system. In a forward error correction scheme, error correction data is added to a data transmission between chips, but the added error correction data is not necessarily synchronized with data transmission. The introduction of non-synchronized data to a data transmission can introduce a variance of, e.g., up to 16 clock cycles in the latency of data transmission between adjacent chips.

When data is transmitted from one chip to another, non-adjacent chip (e.g., from P0 to P7), the variance in latency for each inter-chip transmission (e.g., from P0 to P1, from P1 to P2, etc.) accumulates into a cumulative latency at the destination chip (P7). Taking just the variance due to forward error correction as an example, the latency of a single inter-chip transmission (e.g., from P0 to P1) has a variance of ±16 clock cycles. Some operations, however, may require transmission of data from one chip 102 to another, non-adjacent chip 102, e.g., from chip P0 to chip P3, or even around the ring from the first chip P0 to the last chip P7. As discussed in more detail below, to transmit data from one chip to another, non-adjacent chip (e.g., P0 to P7), data can be transmitted through each of the intervening chips (e.g., through chips P1 to P6) using bypass operations. However, the latency variance between chips will accumulate across 8 chips, with the total variance in latency around the ring approaching ±128 clock cycles. The processes described below improve the predictability of data transmission between chips, and, in some examples, allow inter-chip data transmission to be performed in a deterministic manner.

Figure 2:
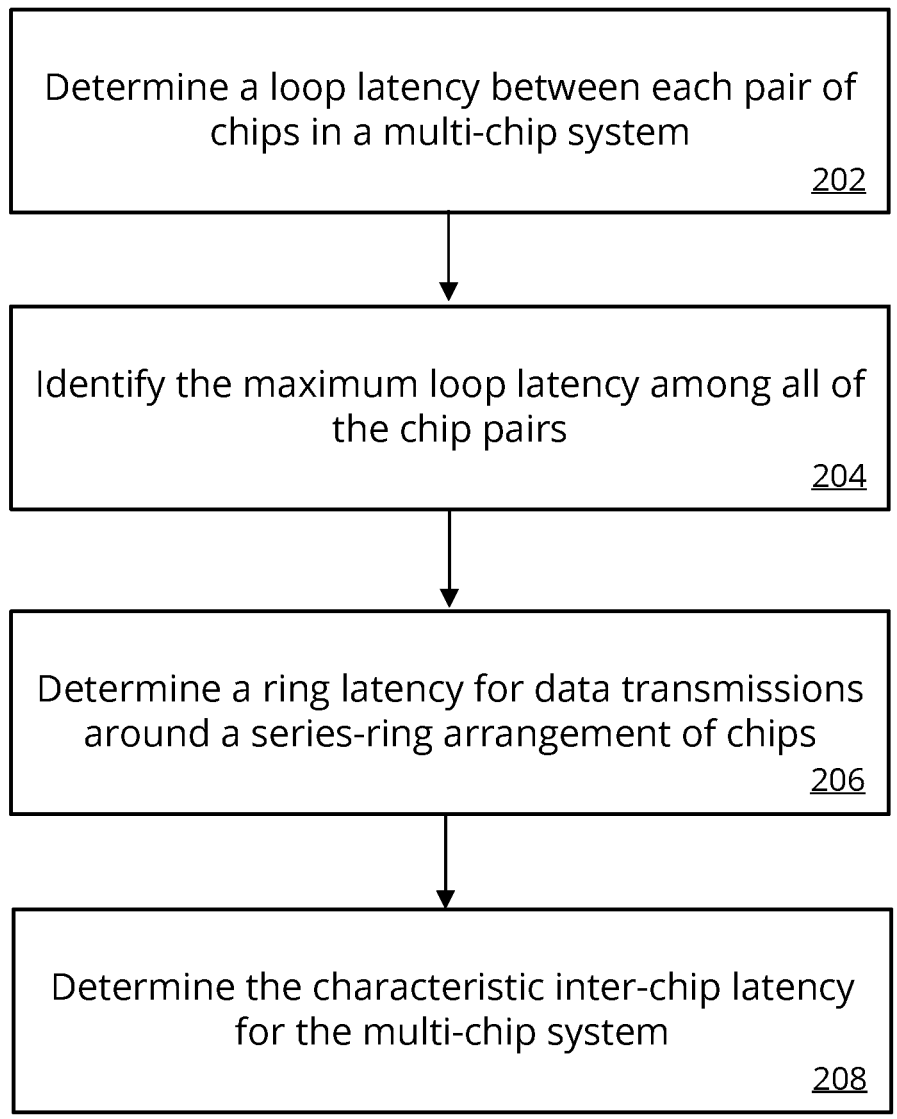
FIG. 2 is a flowchart of an example process for characterizing the maximum latency in a multi-chip system in accordance with implementations of the present disclosure.

FIG. 2 depicts a flowchart of an example process 200 for characterizing the maximum latency in a multi-chip system 100. Process 200 will be described in reference to FIGS. 1, 2, and 3A-3B. In some implementations, process 200, or portions thereof, is executed or controlled by the system driver 104. In some examples, process 200, or portions thereof, is executed by the individual chips 102 of the multi-chip system 100. The characterization process 200 is used to determine a characteristic inter-chip latency, e.g., a maximum inter-chip latency ($L_{max}$), of a multi-chip system design. For example, process 200 may be performed for initial chip arrangements, and/or new, system topologies.

The first step of process 200 includes determining a loop latency between each pair of chips in a multichip system 100 (step 202). For example, as shown in FIG. 1, the depicted multichip system 100 has ten individual inter-chip communication loops (112, 114) with independently measurable latencies. There are nine loops 112 between adjacent chips 102, and one 114 around the entire ring. In the multi-chip system, absolute latency values may only be measurable in these loops 112, 114 since there is no common time reference available. That is, although each of the chips 112, 114 are driven by a common clock 106, the local counters on each chip 112, 114 are not necessarily synchronized to the same count value. In other words, the "local time" on each chip 112, 114 may be different. Measuring loop latencies rather than individual one-way latencies between chips can be used to account for the differences between local counters on each chip, as described in more detail below.

The nine single chip loops 112 going counter-clockwise first and then clockwise have the same latency as the clockwise-first loops because these loop latencies are simply the sum of the latency in each direction. Likewise, the full system counter-clockwise loop 114 has the same latency as the sum of all nine single chip loops 112 minus the latency of the clockwise system loop 114. Measuring latency differences in different directions around the loop between two chips does not provide more information as these differences can be derived from the nine small loops 112 and the single system loop 114.

Figure 3A:
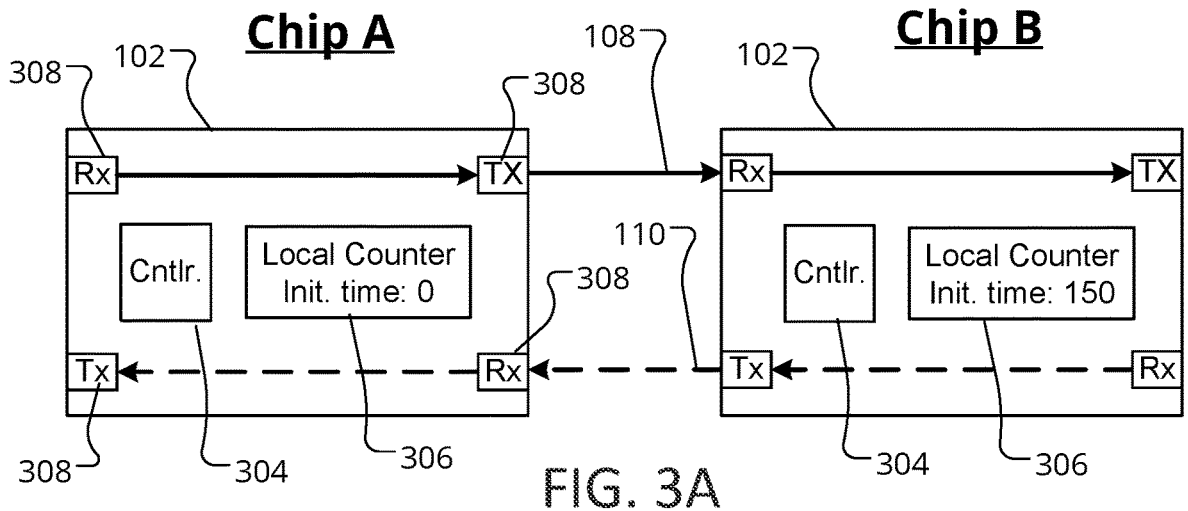
FIGS. 3A-3C show a series of block diagrams illustrating loop latency measurements between two chips in accordance with implementations of the present disclosure.
Figure 3B:
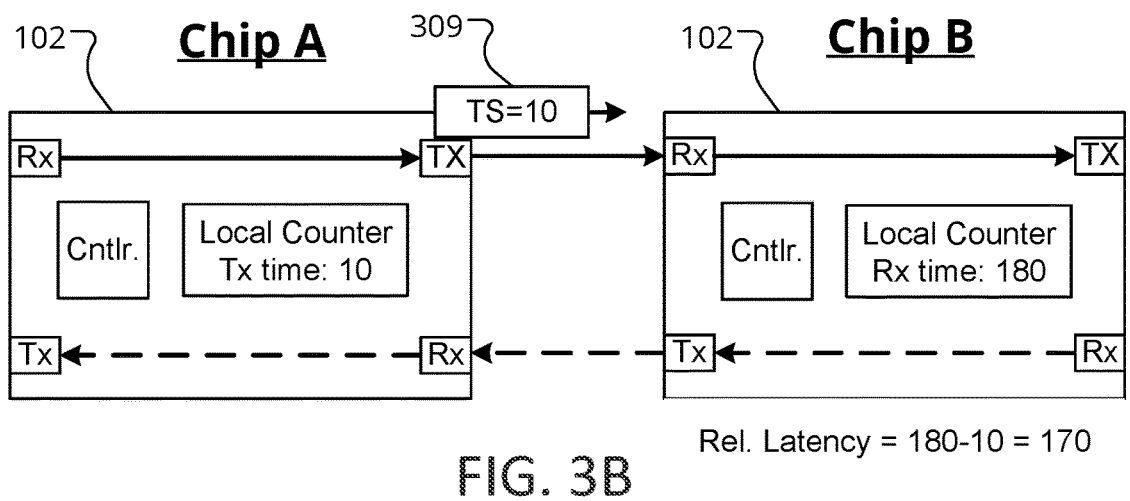
Figure 3C:
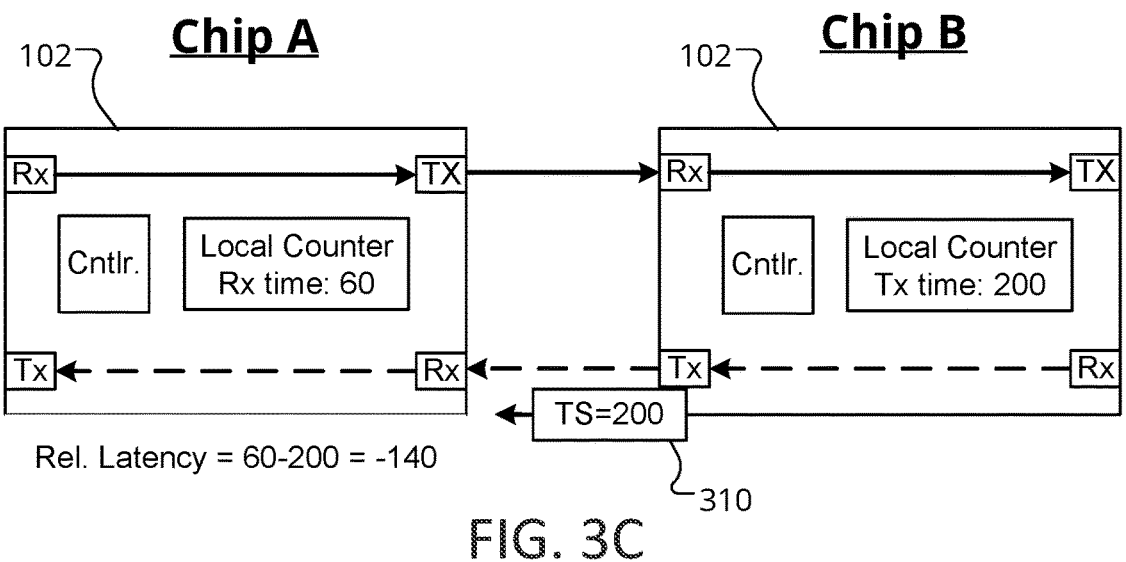

FIGS. 3A-3C show a series of block diagrams illustrating loop latency measurements between adjacent chips 102. FIGS. 3A-3C depict simplified block diagrams of two adjacent chips 102: Chip A and Chip B. Each chip 102 includes a controller 304 that controls the local operations of the chip, a local counter 306, and communication interfaces 308. For clarity of explanation, the communication interfaces 308 are represented as from transmitter interfaces (Tx) and to receiver interfaces (Rx). The communication interfaces 308 include First-In-First-Out (FIFO) buffers.

To measure the loop latency, each chip to initializes its local counter 306, e.g., by booting the chip 102. Each chip's local counter 306 represents its local time as discussed above. In some implementations, the chips 102 perform their individual operations (e.g., computations, reading data from input buffers, and transmitting data to other chips) at pre-scheduled counter times. The counters 306 do not need to be synchronized in any way for process 200. For instance, in the example shown in FIG. 3A Chip A's local counter 306 is initialized to time 0, and Chip B's local counter 306 is initialized at time 150, consequently Chip A's and Chip B's local counters are out of synchronization by 150 clock cycles. The boot synchronization process discussed below is used to synchronize the local counters 306 in the chips 102. It should be noted that the counter times used in FIGS. 3A-3C (and FIGS. 6A and 6B) are simplified for purposes of explanation.

Referring to FIGS. 3B and 3C, to measure the round trip latency between Chip A and Chip B, Chip A and Chip B execute a series of time stamped data transmissions, first from Chip A to Chip B, then from Chip B to Chip A. For example, first Chip A sends time stamped data 309 to Chip B in order to measure the relative one-way latency for transmissions in the first direction, e.g., from Chip A to Chip B on the clockwise data path 108. Chip A sends data 309 to Chip B that includes a time stamp with Chip A's local counter time (e.g., 10) when the data 309 was sent. For clarity of explanation FIG. 3B shows only one data transmission being sent to Chip A. In practice, for example, Chip A can send a series of data transmissions 309 at different points in the 512 cycle physical coding sublayer (PCS) period, each time-stamped with Chip A's local counter time at the time of transmission. Chip B receives the data 309 and records its own local counter time (e.g., 180). The difference between Chip A's local time (e.g., 10) when the data 308 was sent and Chip B's local time (e.g., 180) when the data 308 was received is equal to the relative one-way relative latency from Chip A to Chip B. For example, the relative one-way latency as illustrated in FIG. 3B is 170 clock cycles.

As shown in FIG. 3C, Chip B performs the same process to measure the measure the relative one-way latency for transmissions in the second direction, e.g., from Chip B to Chip A on the counterclockwise data path 110. Chip B sends a data 310 to Chip A that includes a time stamp with Chip B's local counter time (e.g., 200) when the data 310 was sent. For clarity of explanation FIG. 3C shows only one data transmission being sent to Chip A. In practice, for example, Chip B can send a series of data transmissions at different points in the 512 cycle PCS period, each time-stamped with Chip B's local counter time at the time of transmission. Chip A receives the data 310 and records its own local counter time (e.g., 60). The difference between Chip B's local time (e.g., 200) when the data 310 was sent and Chip A's local time (e.g., 60) when the data 310 was received is equal to the relative one-way relative latency in the direction from Chip B to Chip A. For example, the relative one-way latency as illustrated in FIG. 3C is −140 clock cycles. It should be noted that the relative one-way latencies can be negative due to local counter differences between two adjacent chips 102.

Once a series of data transmission has been performed, each chip 102 (e.g., Chips A and B) calculates a relative one-way latency in one direction based on the timestamp value included in the data (e.g., data 308 and data 310) and its own local counter time when the data was received. Each chip 102 can then identify the maximum relative one-way latency that it measured and send the maximum relative one-way latency to the system driver 104 for calculation of the respective maximum loop latency. In some implementations each chip 102 sends the timestamp data from each transmission in the series of transmissions along with its own associated local counter value at the time that each transmission was received to the system driver 104. The system driver 104 then calculates, for each pair of chips, the relative one-way latencies in each direction, identifies the maximum one-way latency in each direction, and calculates the respective maximum loop latency.

The relative one-way latency values are not meaningful by themselves because the local counters on each chip 102 will be in unknown states. But when the two relative one-way latencies between a given pair of chips 102 are summed (e.g., the relative one-way latency from Chip A to Chip B with the relative one-way latency from B back to A), the local counter differences cancel leaving only the absolute latency around the loop between Chip A and Chip B. For example, the loop latency calculation can be represented by the following equations:

$$\max(R_b - S_a) = L_{ab} + C_{ba};$$

$$\max(R_a - S_b) = L_{ba} - C_{ba}; \text{ and}$$

$$L_{inter\text{-}chip\_loop\_max} = \max(R_a - S_b) + \max(R_b - S_a) = L_{ab} + C_{ba} + L_{ba} - C_{ba} = L_{ab} + L_{ba}.$$

$R_a$, $R_b$ represent the local counter time that time stamped data was received on Chip A or Chip B, respectively (e.g., $R_a$ is 60 and $R_b$ is 180 in the present example). $S_a$, $S_b$ represent the counter time when the data was sent by Chip A or Chip B, respectively (e.g., $S_a$ is 10 and $S_b$ is 200 in the present example). $C_{ba}$ the difference in counter times between Chip B's local counter time and Chip A's local counter time: Cba=Cb−Ca (this is not directly observable) (e.g., $C_{ba}$ is 150 in the present example). $L_{ab}$ is the max jitter absolute latency from Chip A to Chip B (this is not directly observable). $L_{ba}$ is the max jitter absolute latency from Chip B to Chip A (this is not directly observable). max $(R_b - S_a)$ represents the maximum relative one-way latency from Chip A to Chip B. max $(R_b - S_a)$ is the difference between Chip B's local counter time when data is received from Chip A and Chip A's local counter time when the data was sent. This is also equivalent to the actual latency (Lab) in the direction from Chip A to Chip B plus the difference between Chip B's counter and Chip A's counter (Cba). max $(R_a - S_b)$ represents the maximum relative one-way latency from Chip B to Chip A. max (Ra−Sb) is the difference between Chip A's local counter time when data is received from Chip B and Chip B's local counter time when the data was sent. This is also equivalent to the actual latency (Lba) in the direction from Chip B to Chip A minus the difference between Chip B's counter and Chip A's counter (Cba). This relationship could also be restated as max $(R_a - S_b)$=Lba+Cab, where Cab is Chip A's counter value minus Chip B's counter value, e.g., the opposite of Cba. Simply put, the offset between local counters on two chips creates the appearance of "additive" latency for transmissions in one direction and "subtractive" latency for transmissions in the opposite direction. $L_{inter\text{-}chip\_loop\_max}$ represents the maximum loop latency for a given loop 112 between two chips.

After running several measurements of single chip to neighbor loops 112, the system driver 104 identifies the maximum loop latency among all the chip pairs (step 204). For example, the system driver 104 can compare the maximum measured loop latencies from each of the transmission loops 112 between each chip pair to identify the maximum chip-to-chip loop latency ($L_{loop\_max}$).

One of the chips 102 or the system driver 104 determines the ring latency for data transmissions around the entire ring 114 (step 206) For example, a similar technique to that described with respect to FIGS. 3A-3C, is used to measure and compute the latency around the full ring, except that time stamped data is transmitted around the full ring and received at the same chip 102 that sent the data. The maximum transmission time measured around the full ring loop 114 will be the maximum full ring latency ($L_{ring\_max}$). Consequently, local counter differences are not a concern.

The system driver 104 determines the characteristic inter-chip latency ($L_{max}$) for the multi-chip system 100 (step 208). For example, the system driver 104 can compare half of the maximum chip-to-chip loop latency with one-Nth of the maximum full ring latency, where N is the total number of chips 102 in the multi-chip system 100 to estimate the maximum one-way latency in the system 100. The greater of these two values is the characteristic inter-chip latency ($L_{max}$) for the multi-chip system 100. The system driver 104 can store the characteristic inter-chip latency for use in future operations. For example, the characteristic inter-chip latency will be a constant used in other operation such as boot-time synchronization and data transmission as discussed below. In some implementations, the characteristic inter-chip latency is also used by the compiler for generating operations schedules for each chip 102 to execute particular software applications e.g., a particular machine learning algorithm. For example, characteristic inter-chip latency represents the longest time that it would take for data to be transferred from one chip to an adjacent chip. The compiler can use the characteristic inter-chip latency to schedule a receiving chip to read data from an input FIFO buffer after an adjacent chip has sent the data and be assured that all the data would have arrived by the scheduled read time.

In some implementations, the $L_{max}$ can be increased by a design factor to account for any variances that may not have been measured during the characterization process. For example, the measured $L_{max}$ may not account for the maximum possible variance in the latency for data transmission between adjacent chips. Therefore, in some implementations $L_{max}$ can be increased to ensure that the actually inter-chip latencies experienced by the multi-chip system 100 will not exceed the value of $L_{max}$.

Figure 4:
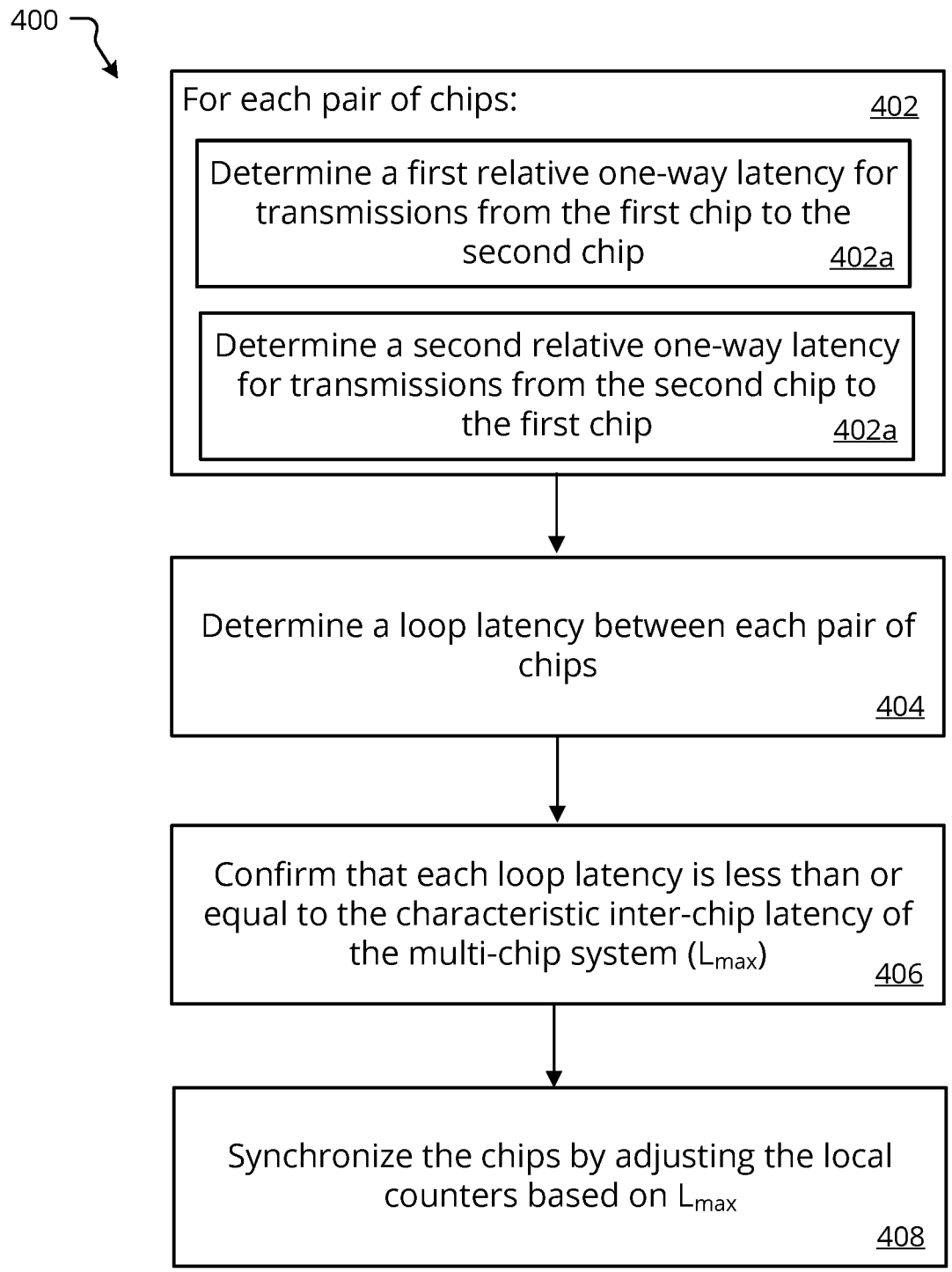
FIG. 4 is a flowchart of an example process for synchronizing local counters of chips in a multi-chip system in accordance with implementations of the present disclosure.

FIG. 4 is a flowchart of an example process 400 for synchronizing local counters of chips in a multi-chip system 100. Process 400 will be described in reference to FIGS. 1, 3A-3B, and 4. In some implementations, process 400, or portions thereof, is executed or controlled by the system driver 104. In some examples, process 400, or portions thereof, is executed by the individual chips 102 of the multi-chip system 100. The synchronization process 400 is used to synchronize the local counters 306 of the chips 102 in the multi-chip system 100. Process 400 can be performed when the system 100 is booted, and hence is referred to as a "boot synchronization" process. However, process 400 can also be performed at other times as well, e.g., if the multichip system is reset.

For each chip pair, a first relative one-way latency for data transmission from a first chip in the pair (e.g., Chip A) to a second chip in the pair (e.g., Chip B) is determined (step 402a), and a second relative one-way latency for data transmission from the second chip in the pair (e.g., Chip B) to the first chip in the pair (e.g., Chip A) is determined (step 402b). For example, the relative one-way latency on the clockwise data path 108 between the two chips can be determined, and then the relative one-way latency on the counter clockwise data path 110 between the two chips can be determined. The first and second relative one-way latencies can be measured, for example, using the techniques described above with reference to FIGS. 3A-3C. The chips 102 send the measured relative one-way latencies back to the system driver 104. In some implementations, the system driver 104 controls the individual chips 102 to perform the relative one-way latency measurements. In some implementations, the individual chips 102 include software (e.g., firmware) that controls the individual chips 102 to perform the relative one-way latency measurements upon the system being booted or reset.

The system driver 104 determines the loop latency between each pair of chips (step 404). For example, the system driver 104 can determine the loop latency between a pair of chips based on the respective relative one-way latencies measured between that pair of chips. For example, the system driver 104 can use the equation $L_{loop}=(R_a-S_b)+(R_b-S_a)$ to calculate a loop latency between a given pair of chips. The system driver 104 can repeat the calculation for each loop 112 between respective pairs of chips in the multi-chip system 100.

The system driver 104, optionally, confirms that each loop latency is less than or equal to the characteristic inter-chip latency of the multichip system ($L_{max}$) (step 406). For example, the system driver 104 can compare the calculated loop latency for each pair of chips to the stored value of the characteristic inter-chip latency. In some implementations, if any of the calculated loop latencies is greater than the characteristic inter-chip latency, system driver 104 may re-perform the loop latency measurements. For example, the system driver 104 may cause steps 402 and 404 to be re-performed. In some implementations, the system driver 104 may generate an error signal if any of the calculated loop latencies is greater than characteristic inter-chip latency.

The system driver 104 synchronizes the chips 102 by adjusting the local counter of one or more chips based on the characteristic inter-chip latency ($L_{max}$) (step 408). For example, referring to FIG. 1, one chip 102 of the multichip system 100 may be selected as a reference chip. For example, the counter value of the reference chip will serve as a base for adjusting the respective local counters 306 of the other chips 102 in the multichip system 100 in order to synchronize the chips 102. In the present example, the FPGA chip will be used as the reference chip. The system driver 104 adjusts local counters in a pairwise fashion starting from the reference chip. The system driver 104 adjusts the local counter time of one chip in each pair of adjacent chips based on $L_{max}$ and one of the measured one-way latencies between the chips. For example, starting with the FPGA and P0, the system driver 104 adjusts the local counter time of P0 based on $L_{max}$ and the measured one-way latency for data transmissions from the FPGA to P0 (e.g., the measured one-way latency for data transmissions along the clockwise data path 108). After the local counter in P0 is adjusted, the system driver 104 adjusts local counter of Chip P1. For example, the system driver 104 adjusts local counter time of P1 based on $L_{max}$ and the measured one-way latency for data transmissions from P0 to P1. The system driver 104 repeats this process to adjust the local counter of each chip 102 around the ring until all the chips have been synchronize. However, the local counter of the FPGA (e.g., reference chip) is not adjusted.

More specifically, using the example shown in FIGS. 3A and 3B, system driver 104 adjusts the local counter time of one chip in a pair of chips based on $L_{max}$ and one of the measured relative one-way latencies between the two chips. The system driver 104 can adjust a chip's local counter 306 by increasing the counter value by $L_{max}$ minus the measured relative one-way latency from one chip in the pair to the chip whose local counter is being adjusted. That is, the new counter value ($T_{new}$) can be determined by: $T_{new}=T_{old}+L_{max}-(R_b-S_a)$, where $T_{old}$ is the original counter value and $(R_b-S_a)$ represents the relative one-way latency measured by the chip whose counter is being adjusted. For example, in FIG. 3B the relative one-way latency from Chip A to Chip B was measured to be 170. Assuming an $L_{max}$ of 30, the adjustment to Chip B's counter would be $L_{max}-(R_b-S_a)$ or 30−170=−140. So, the system driver 104 would increase Chip B's local counter by −140 counts (e.g. decrease the local counter by 140). Using the simplest case as an example (e.g., the counter times shown in FIG. 3A), the system driver 104 would adjust A Chip B's local counter from 150 to 10. Although the adjusted value for Chip B's local counter is not identical to the value of Chip A's local counter (e.g., 0), the two chips can be considered synchronized for the purposes of this disclosure. For example, the synchronization process does not necessarily force the local counters of two chips to be equal, but synchronizes the data transmission latency between each pair of chips across the multichip system so that the maximum relative one-way latency between each pair of chips is less than or equal to $L_{max}$.

In some implementations, the FIFO buffers at the Rx communication interfaces 308 of the chips 102 can also be adjusted. For example, the system driver 102 can adjust the perceived latency between inter-chip links by increasing or decreasing the receive buffer size (e.g., adding or removing latency in 4 ns increments, until the chip loops 112 all have a loop latency in the range $[2L_{max}-3, 2L_{max}]$. Consequently, full-system loop 114 would then have a loop latency is in the range $[NL_{max}31\ 3, NL_{max}]$, where N is the number of chips in the loop. Generally, latency will only need to be added, but it is possible that latency might need to be removed from some counter-clockwise pointing data paths 110, e.g., in a case where all of the two-chip loops are within their limits, but the full system clockwise loop 114 needs more latency. In that case, the system driver 104 can remove some latency on some of the counter-clockwise data paths 110 (e.g., by decreasing one or more of the chip's receive buffers that are couponed to a counter-clockwise data path 110, and add the same amount of latency to the clockwise links (e.g., by increasing appropriate receive data buffers), thereby, preserving the latency on each two-chip loop 112 while adding latency on the clockwise system loop 114. In some implementations, latency can be adjusted by increasing or decreasing appropriate transmitter FIFO buffer sizes rather than or in addition to adjusting receiver side FIFO buffers.

Referring to FIG. 1, even after the chips 102 have been synchronized, one or more other remaining variance in chip-to-chip and data transmissions may need to be addressed. For example, the latency variance arising due to forward error correction (FEC) operations may need to be addressed. This variance impacts transmissions from one chip to another, non-adjacent chip greater than transmissions between adjacent chips. For example, to transmit data from one chip to another, non-adjacent chip (e.g., around the ring from the first chip P0 to the last chip P7), data can be transmitted through each of the intervening chips (e.g., through chips P1 to P6) using bypass operations. The latency of each data path between adjacent chips has constant and variable components. The exact value of the variable component can be difficult or impossible to determine. When transmitting data from one chip (e.g., P0) to another, non-adjacent chip (e.g., P7), e.g., in a bypass operation, the cumulative variance in the latency is the sum of the variance in the latency for each link across which the data is transmitted. At the destination chip (e.g., P7), the cumulative variance in the latency can be significant, resulting in a large amount of variability in the arrival time of the transmitted data at the destination chip (e.g., P7). In a synchronous system, this variability in arrival time can necessitate significant buffering of data at the destination. To eliminate the variability in arrival time at the destination chip (e.g., P7) arising from the cumulative variance in latency, a delay can be imposed on the data transmission from each chip 102. The introduction of a delay at each chip 102 negates the effect of the variance in latency, and the arrival time of the data at the destination chip becomes deterministic and compatible with a synchronous system.

In some implementations, the delay is built in to the operations of each chip by a program compiler. For example, the program compiler uses Lmax to generate program instructions as explicitly scheduled operations for each chip. As described in more detail below in reference to FIGS. 5, 6A, and 6B, each chip can be pre-scheduled to re-transmit data received from an adjacent chip at a time that is the maximum inter-chip latency (e.g., Lmax) after the data was transmitted to the chip. For example, the operations of chip P0 can be pre-scheduled to transmit data to chip P1 at local counter time t. Chip P1 would then be pre-scheduled to re-transmit the data to chip P2 at local counter time t+Lmax.

One source of timing variability is a property of the physical link between two adjacent chips (e.g., PCS jitter), which can introduce a variance in the latency of data transmission between adjacent chips 102. This source of variability is addressed by the system characterization and synchronization processes (200 and 400) described above. However, a second source of timing variability is the lack of synchronization between internal chip operations and a forward error correction scheme implemented by the multi-chip system 100. In a forward error correction scheme, error correction data is added to a data transmission between chips 102, but the added error correction data is not necessarily synchronized with data transmission. The introduction of non-synchronized data to a data transmission can introduce a variance of, e.g., up to 16 clock cycles in the latency of data transmission between adjacent chips.

When data is transmitted from one chip 102 to another, non-adjacent chip 102 (e.g., from P0 to P7), the variance in latency for each inter-chip transmission (e.g., from P0 to P1, from P1 to P2, etc.) accumulates into a cumulative latency at the destination chip (P7). Taking just the variance due to forward error correction as an example, the latency of a single inter-chip transmission (e.g., from P0 to P1) has a variance of ±16 clock cycles. Some operations, however, may require transmission of data from one chip 102 to another, non-adjacent chip 102, e.g., from chip P0 to chip P3, or even around the ring from the first chip P0 to the last chip P7. As discussed in more detail below, to transmit data from one chip to another, non-adjacent chip (e.g., from P0 to P7), data can be transmitted through each of the intervening chips (e.g., through chips P1 to P6) using bypass operations. However, the latency variance between chips will accumulate across 8 chips, with the total variance in latency around the ring approaching ±128 clock cycles. To make this large variability in arrival time at the destination chip compatible with a synchronous system, a significant amount of buffering of data can be implemented at receiver interfaces, e.g., Rx communication interfaces 308 by increasing receive FIFO buffer sizes on each chip 102.

Additional buffering can be avoided, however, by preventing the accumulation of variance in latency throughout a multi-chip data transmission process. To achieve this, a small amount of delay can be introduced into the data transmission operation at each chip 102 such that the latency for data transmission between each pair of adjacent chips 102 is fixed rather than variable. Specifically, the maximum inter-chip latency ($L_{max}$) is determined as discussed above. During data transmission, when data is received at a chip 102 in a bypass operation, the data is stored in a receive buffer, such as a FIFO buffer, rather than being sent immediately to the next chip. The data is released from the buffer only after the maximum inter-chip latency (e.g., $L_{max}$) has elapsed since the data transmission was initiated at the previous chip 102. In controlling the timing of each bypass operation in a data transmission process, the exact amount of time the entire data transmission process will then be a known value, meaning that there is no variability in the perceived arrival time of the data at the destination chip 102.

Figure 5:
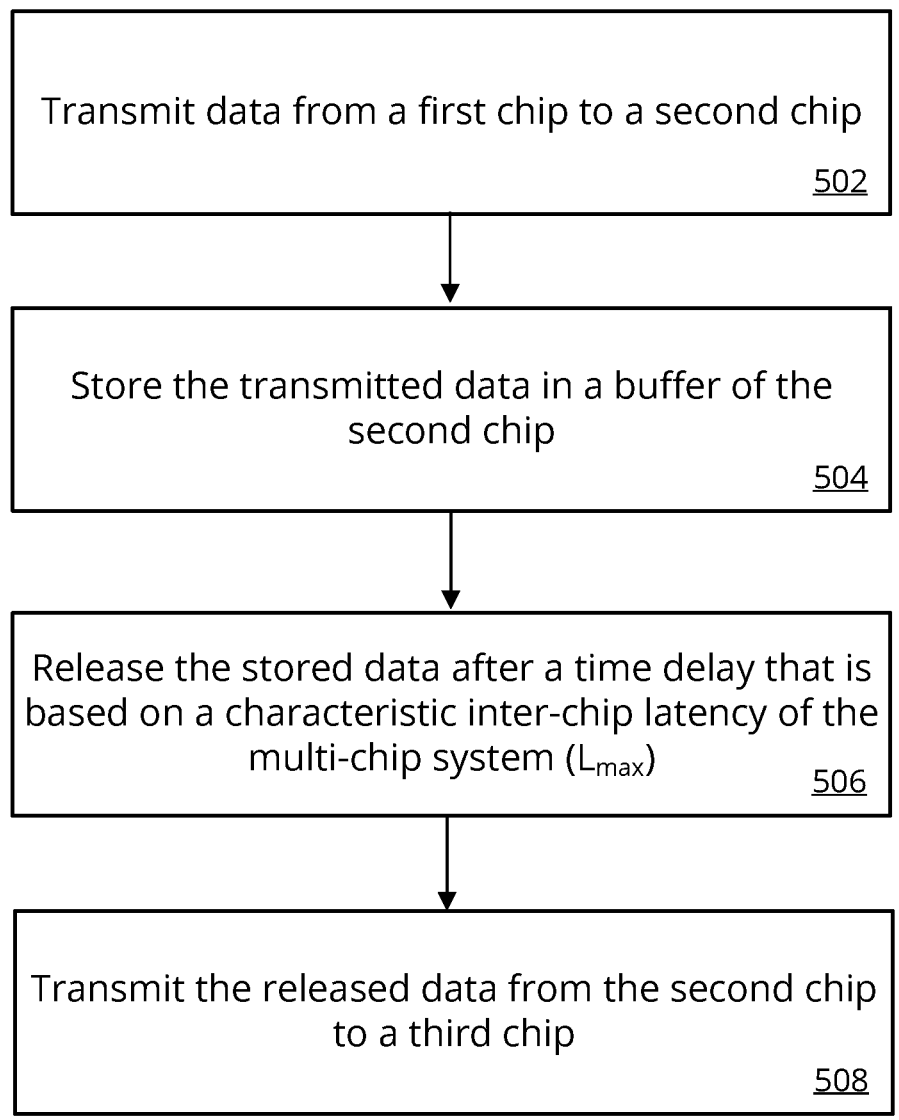
FIG. 5 is a flowchart of an example process for conducting data transmissions between chips in a multi-chip system in accordance with implementations of the present disclosure.
Figure 6A:
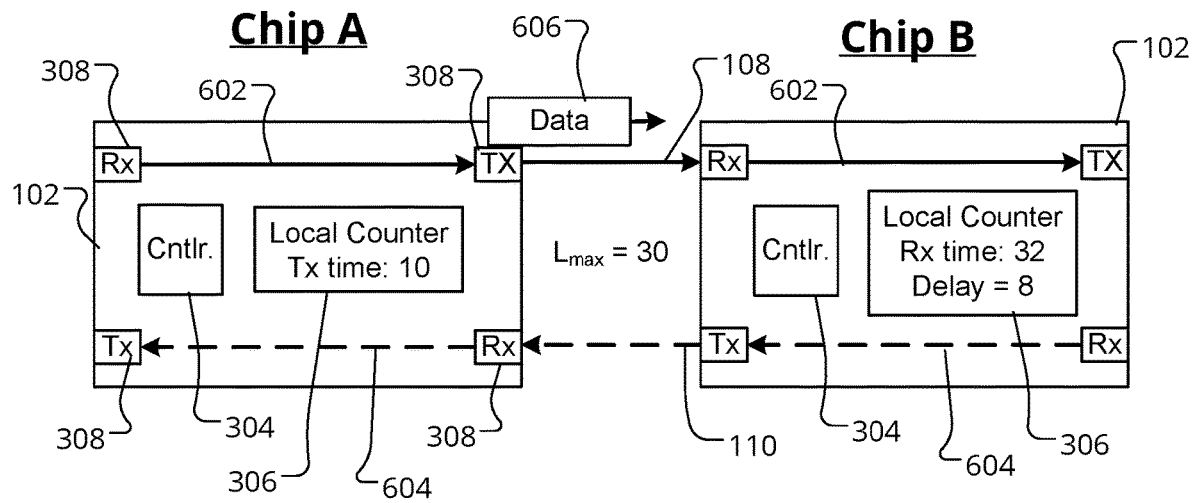
FIGS. 6A and 6B show a series of block diagrams illustrating the data transmission process of FIG. 5.
Figure 6B:
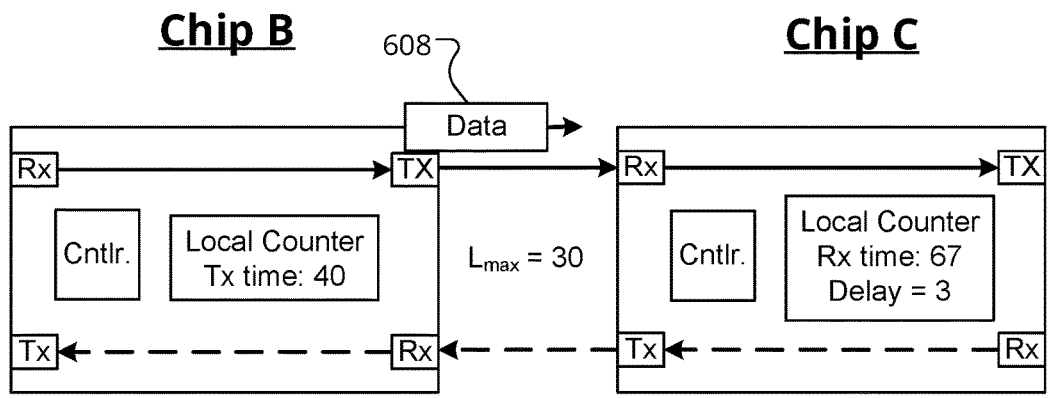

FIG. 5 is a flowchart of an example process 500 for conducting data transmissions between chips in a multi-chip system 100. Process 500 will be described in reference to FIGS. 1, 5, and 6A-6B. FIGS. 6A and 6B show a series of block diagrams illustrating the data transmission process 500. The block diagrams are similar to those in FIGS. 3A-3C, with the exception that internal bypass data paths 602 and 604 are labeled. For example, the chips 102 can include a bypass data paths in two directions that allow the chip 102 to directly route data to the next chip in the ring topology.

Process 500, or portions thereof, is executed by the individual chips 102 of the multi-chip system 100. The data transmission process 500 is used to reduce the variability in data arrival times at destination chips 102 in the multi-chip system 100 in order to make data communications between chips 102 more deterministic. Furthermore, the data transmission process 500 may reduce the data input buffer sizes required on each chip 102. Process 500 also allows the sequence of operations performed by each chip 102 in the multi-chip system 100 to be pre-scheduled and performed at pre-scheduled local counter times.

As shown in FIGS. 6A and 6B, data 606 is transmitted from a first chip (e.g., Chip A) to a second chip (e.g., Chip B) (step 502). For example, the data 606 is bypass data that is intended for a another chip 102 in the system 100, and not for Chip B. Chip B receives the data 606, and stores the data 606 in a buffer (step 504). For example Chip B stores the data 606 in a FIFO buffer. Chip B stores the data until the maximum inter-chip latency has elapsed from when Chip A send the data. In the illustrated example, Chip B receives the data 606 at local counter time 32 and the maximum inter-chip latency is assumed to be $L_{max}$=30 counter cycles. Thus, Chip B does not transmit the data 606 to the next chip in the system 100 (e.g., Chip C) until local counter time 40 (e.g., 40=Chip A's local counter time (10) when the data 606 was transmitted to Chip B plus the maximum inter-chip latency (30)), for example. This represents an exemplary delay time of eight counter cycles.

After the maximum inter-chip latency (e.g., $L_{max}$) has elapsed from when the first chip (e.g., Chip A) transmitted the data 606, the second chip (e.g., Chip B) releases the stored data from the buffer (step 506), and transmits the released data 608 (FIG. 6B) to a third chip (e.g., Chip C) (step 508). For example, after 30 cycles of Chip B's counter has elapsed from when Chip A transmitted the data 606 to Chip B, Chip B can release the data 606 from its FIFO buffer, pass the data along internal bypass path 602, and transmit the data (shown as 608 in FIG. 6B) to Chip C.

In some implementations, chip operations are explicitly scheduled at predetermined counter values. So, for example, the delay time for storing bypass data in a given chips buffer is accounted for in the scheduled operations. For example, in reference to the example described above, Chip A's scheduled operating instructions would instruct Chip A to transmit the data 606 to Chip B at Chip A's local counter time of 10. Chip B's scheduled operating instructions would instruct Chip B to release the data 606 from its input buffer and retransmit the data to Chip C at Chip B's local counter time of 40. Thus, Chip B does not need to internally calculate a delay time for retransmitting the data 606.

Figure 7:
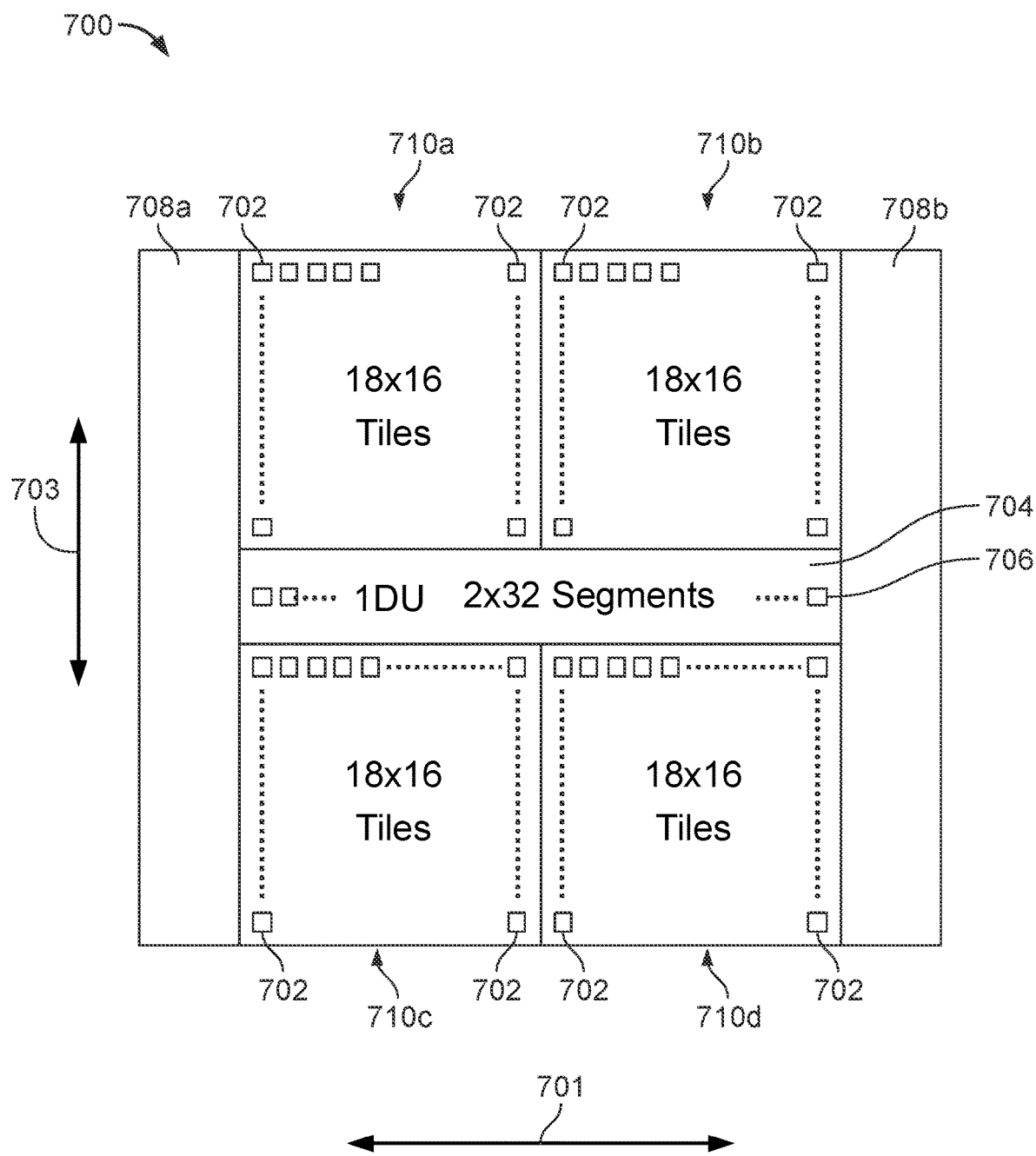
FIG. 7 is a schematic that illustrates an example of special purpose logic chip that can be used in the multi-chip system of FIG. 1.

FIG. 7 is a schematic that illustrates an example of special purpose logic chip (e.g., an ASIC 700) that can be used as one of the chips 102 in the system 100 of FIG. 1, e.g., as the ASIC chips P0-P7. The ASIC 700 includes multiple tiles 702, in which one or more of the tiles 702 includes special purpose circuitry configured to perform operations, such as e.g., multiplication and addition operations. In particular, each tile 702 can include a computational array of cells (e.g., similar to the computational units 24 of FIG. 1), in which each cell is configured to perform mathematical operations (see, e.g., the exemplary tile 200 shown in FIG. 4, and described herein). In some implementations, the tiles 702 are arranged in a grid pattern, with tiles 702 arranged along a first dimension 701 (e.g., rows) and along a second dimension 703 (e.g., columns). For instance, in the example shown in FIG. 7, the tiles 702 are divided into four different sections (710a, 710b, 710c, 710d), each section containing 288 tiles arranged in a grid of 18 tiles down by 16 tiles across. In some implementations, the ASIC 700 shown in FIG. 7 may be understood as including a single systolic array of cells subdivided/arranged into separate tiles, in which each tile includes a subset/sub-array of cells, local memory and bus lines (see, e.g., FIG. 4).

The ASIC 700 also includes a vector processing unit 704. The vector processing unit 704 includes circuitry configured to receive outputs from the tiles 702 and compute vector computation output values based on the outputs received from the tiles 702. For example, in some implementations, the vector processing unit 704 includes circuitry (e.g., multiply circuitry, adder circuitry, shifters, and/or memory) configured to perform accumulation operations on the outputs received from the tiles 702. Alternatively, or in addition, the vector processing unit 704 includes circuitry configured to apply a non-linear function to the outputs of the tiles 702. Alternatively, or in addition, the vector processing unit 704 generates normalized values, pooled values, or both. The vector computation outputs of the vector processing units can be stored in one or more tiles. For example, the vector computation outputs can be stored in memory uniquely associated with a tile 702. Alternatively, or in addition, the vector computation outputs of the vector processing unit 704 can be transferred to a circuit external to the ASIC 700, e.g., as an output of a computation.

In some implementations, the vector processing unit 704 is segmented, such that each segment includes circuitry configured to receive outputs from a corresponding collection of tiles 702 and computes vector computation outputs based on the received outputs. For instance, in the example shown in FIG. 7, the vector processing unit 704 includes two rows spanning along the first dimension 701, each of the rows including 32 segments 706 arranged in 32 columns. Each segment 706 includes circuitry (e.g., multiply circuitry, adder circuitry, shifters, and/or memory) configured to perform a vector computation, as explained herein, based on outputs (e.g., an accumulated sum) from a corresponding column of tiles 702. The vector processing unit 704 can be positioned in the middle of the grid of tiles 702 as shown in FIG. 7. Other positional arrangements of the vector processing unit 704 are also possible.

The ASIC 700 also includes a communication interface 708 (e.g., interfaces 7010A, 7010B). The communication interface 708 includes one or more sets of serializer/deserializer (SerDes) interfaces and a general purpose input/output (GPIO) interface. The SerDes interface is configured to receive input data for the ASIC 700 and to output data from the ASIC 700 to an external circuit. For example, the SerDes interface can be configured to transmit and receive data at a rate of 32 Gbps, 56 Gbps, or any suitable data rate over the set of SerDes interfaces included within the communications interface 708. For example, the ASIC 700 may run a boot program when it is turned on. The GPIO interface may be used to load instructions (e.g., operation schedules) onto the ASIC 700 and to communicate with the system driver 104 to execute a boot synchronization process (e.g., process 400).

The ASIC 700 further includes multiple controllable bus lines (see, e.g., FIG. 4) configured to convey data among the communications interface 708, the vector processing unit 704, and the multiple tiles 702. Controllable bus lines include, e.g., wires that extend along both the first dimension 701 (e.g., rows) of the grid and the second dimension 703 (e.g., columns) of the grid. A first subset of the controllable bus lines extending along the first dimension 701 can be configured to transfer data in a first direction (e.g., to the right of FIG. 7). A second subset of the controllable bus lines extending along the first dimension 701 can be configured to transfer data in a second direction (e.g., to the left of FIG. 7). A first subset of the controllable bus lines extending along the second dimension 703 can be configured to transfer data in a third direction (e.g. to the top of FIG. 7). A second subset of the controllable bus lines extending along the second dimension 703 can be configured to transfer data in a fourth direction (e.g., to the bottom of FIG. 7).

Each controllable bus line includes multiple conveyer elements, such as flip-flops, that are used to convey data along the lines in accordance with a clock signal. Transferring data over a controllable bus line can include shifting, at each clock cycle, data from a first conveyer element of the controllable bus line to a second adjacent conveyer element of the controllable bus line. In some implementations, data is conveyed over the controllable bus lines upon the rising or falling edge of a clock cycle. For example, data present, at a first clock cycle, on a first conveyer element (e.g., a flip-flop) of a controllable bus line can be transferred to a second conveyor element (e.g., a flip-flop) of the controllable bus line at a second clock cycle. In some implementations, the conveyer elements can be periodically spaced apart at a fixed distance from one another. For example, in some cases, each controllable bus line includes multiple conveyer elements, with each conveyer element positioned within or proximate to a corresponding tile 702.

To minimize latency associated with internal operations of the ASIC chip 700, the tiles 702 and vector processing unit 704 can be positioned to reduce the distance data travels among the various components. In a particular implementation, both the tiles 702 and communication interface 708 can be segregated into multiple sections, with both the tile sections and the communication interface sections being arranged such that the maximum distance data travels between a tile and a communication interface is reduced. For instance, in some implementations, a first group of tiles 702 can be arranged in a first section on a first side of the communications interface 708, and a second group of tiles 702 can be arranged in a second section on a second side of the communication interface. As a result, the distance from a communication interface to the furthest tile may be cut in half compared to a configuration in which all of the tiles 702 are arranged in a single section on one side of the communication interface.

Alternatively, the tiles may be arranged in a different number of sections, such as four sections. For instance, in the example shown in FIG. 7, the multiple tiles 702 of ASIC 700 are arranged in multiple sections 710 (710a, 710b, 710c, 710d). Each section 710 includes a similar number of tiles 702 arranged in a grid pattern (e.g., each section 710 can include 256 tiles arranged in 16 rows and 16 columns). The communication interface 708 also is divided into multiple sections: a first communication interface 7010A and a second communication interface 7010B arranged on either side of the sections 710 of tiles 702. The first communication interface 7010A can be coupled, through controllable bus lines, to the two tile sections 710a, 710c on the left side of the ASIC chip 700. The second communication interface 7010B can be coupled, through controllable bus lines, to the two tile sections 710b, 710d on the right side of the ASIC chip 700. As a result, the maximum distance data travels (and thus the latency associated with the data propagation) to and/or from a communication interface 708 can be halved compared to an arrangement in which only a single communication interface is available. Other coupling arrangements of the tiles 702 and communication interfaces 708 are also possible to reduce data latency. The coupling arrangement of the tiles 702 and communication interface 708 can be programmed by providing control signals to the conveyer elements and multiplexers of the controllable bus lines.

In some implementations, one or more tiles 702 are configured to initiate reading and writing operations with respect to controllable bus lines and/or other tiles within the ASIC 700 (referred to herein as "control tiles"). The remaining tiles within the ASIC 700 can be configured to perform computations based on the input data (e.g., to compute layer inferences). In some implementations, the control tiles include the same components and configuration as the other tiles within the ASIC 700. The control tiles can be added as an extra tile or tiles, an extra row or rows, or an extra column or columns of the ASIC 700. For example, for a symmetric grid of tiles 702, in which each tile 702 is configured to perform a computation on input data, one or more additional rows of control tiles can be included to handle reading and writing operations for the tiles 702 performing computations on the input data. For instance, each section 710 includes 18 rows of tiles, where the last two rows of tiles may include control tiles. Providing separate control tiles increases, in some implementations, the amount of memory available in the other tiles used to perform the computations. Separate tiles dedicated to providing control as described herein are not necessary, however, and in some cases, no separate control tiles are provided. Rather, each tile may store in its local memory instructions for initiating reading and writing operations for that tile.

Furthermore, while each section 710 shown in FIG. 7 includes tiles arranged in 18 rows by 16 columns, the number of tiles 702 and their arrangement in a section can be different. For example, in some cases, the sections 710 may include an equal number of rows and columns.

Furthermore, although shown in FIG. 7 as divided into four sections, the tiles 702 can be divided into other different groupings. For example, in some implementations, the tiles 702 are grouped into two different sections, such as a first section above the vector processing unit 704 (e.g., nearer the top of the page shown in FIG. 7) and a second section below the vector processing unit 704 (e.g., nearer to the bottom of the page shown in FIG. 7). In such an arrangement, each section may contain, e.g., 596 tiles arranged in a grid of 18 tiles down (along direction 703) by 32 tiles across (along direction 701). Sections may contain other total numbers of tiles and may be arranged in different sized arrays. In some cases, the divisions between sections are delineated by hardware features of the ASIC 700. For example, as shown in FIG. 7, sections 710a, 710b may be separated from sections 710c, 710d by the vector processing unit 704.

Embodiments of the subject matter and the functional operations described in this specification can be implemented in digital electronic circuitry, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC. The apparatus can also include, in addition to hardware, code that creates an execution environment for the computer program in question, e.g., code that constitutes processor firmware, a protocol stack, a database management system, an operating system, or a combination of one or more of them.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA, an ASIC, or a GPGPU (general purpose graphics processing unit).

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, although bus lines are described as "controllable," not all bus lines need to have the same level of control. For instance, there can be varying degrees of controllability, where some bus lines can be controlled only where some bus lines are restricted in terms of the number of tiles from which they can source data or to which they can send data. In an another example, some bus lines may be dedicated to providing data along a single direction, such as north, east, west, or south as described herein. In some cases, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for characterizing inter-chip latency between integrated-circuit chips, the method comprising:
   for each pair of integrated-circuit chips among a topology of integrated-circuit chips: determining an inter-chip loop latency for the pair of integrated-circuit chips;
   identifying a maximum inter-chip loop latency from among the inter-chip loop latencies determined for each pair of integrated-circuit chips;
   computing a full-path latency for the topology of integrated-circuit chips; and
   generating, based on the maximum inter-chip latency and the full-path latency, an inter-chip latency representing an operational characteristic of the topology.

2. The method of claim 1, wherein determining the inter-chip loop latency for the pair of integrated-circuit chips comprises:
   transmitting first timestamped data from a first chip of the pair of integrated-circuit chips to a second chip of the pair of integrated-circuit chips;
   determining, based on the first timestamped data, a first relative one-way latency between the pair of integrated-circuit chips;
   transmitting second timestamped data from the second chip to the first chip;
   determining, based on the second timestamped data, a second relative one-way latency between the pair of integrated-circuit chips, and
   determining the inter-chip loop latency for the pair of integrated-circuit chips based on the first relative one-way latency and the second relative one-way latency.

3. The method of claim 2, wherein the first timestamped data indicates a local counter time of the first chip when the first timestamped data was sent.

4. The method of claim 2, wherein determining the first relative one-way latency between the pair of integrated-circuit chips comprises computing a difference between a time indicated in the timestamped data and a local counter time of the second chip when the second chip received the first timestamped data.

5. The method of claim 2, further comprising:
   determining a loop latency for a round trip data transmission between the pair of integrated-circuit chips by computing a difference between the first relative one-way latency and the second relative one-way latency.

6. The method of claim 1, wherein two or more chips of the integrated-circuit chips are application specific integrated circuit (ASIC) chips configured to execute neural network operations.

7. The method of claim 6, wherein one chip of the integrated-circuit chips is a field programmable gate array chip.

8. The method of claim 6, wherein each ASIC chip is configured to implement a corresponding layer of a neural network.

9. The method of claim 8, wherein a first ASIC chip is configured to implement an input layer of the neural network, and a second ASIC chip is configured to implement a second layer of the neural network based on an output from the first ASIC chip.

10. The method of claim 1, wherein the integrated-circuit chips form a closed-loop.

11. The method of claim 1, wherein each chip of the integrated-circuit chips is configured to perform internal operations that are synchronous and deterministic.

12. A system comprising:
   a processing device;
   multiple integrated-circuit chips; and
   a non-transitory machine-readable storage device for storing instructions that are executable by the processing device to cause performance of operations comprising:
      for each pair of integrated-circuit chips among a topology of integrated-circuit chips: determining an inter-chip loop latency for the pair of integrated-circuit chips;
      identifying a maximum inter-chip loop latency from among the inter-chip loop latencies determined for each pair of integrated-circuit chips;
      computing a full-path latency for the topology of integrated-circuit chips; and
      generating, based on the maximum inter-chip latency and the full-path latency, an inter-chip latency representing an operational characteristic of the topology.

13. The system of claim 12, wherein two or more chips of the integrated-circuit chips are application specific integrated circuit (ASIC) chips configured to execute neural network operations.

14. The system of claim 13, wherein one chip of the integrated-circuit chips is a field programmable gate array chip.

15. The system of claim 13, wherein each ASIC chip is configured to implement a corresponding layer of a neural network.

16. The system of claim 13, wherein a first ASIC chip is configured to implement an input layer of the neural network, and a second ASIC chip is configured to implement a second layer of the neural network based on an output from the first ASIC chip.

17. The system of claim 12, wherein the integrated-circuit chips form a closed-loop.

18. The system of claim 12, wherein each chip of the integrated-circuit chips is configured to perform internal operations that are synchronous and deterministic.

19. The system of claim 12, comprising a clock, wherein the clock is coupled to each chip of the integrated-circuit chips, wherein the clock provides a synchronous timing signal to the integrated-circuit chips.

20. The system of claim 19, wherein each chip of the integrated-circuit chips comprises a corresponding local clock or counter.

* * * * *